Sept. 4, 1956 C. BREER 2,761,413
MAGNETIC ROUTE INDICATOR
Filed April 9, 1952
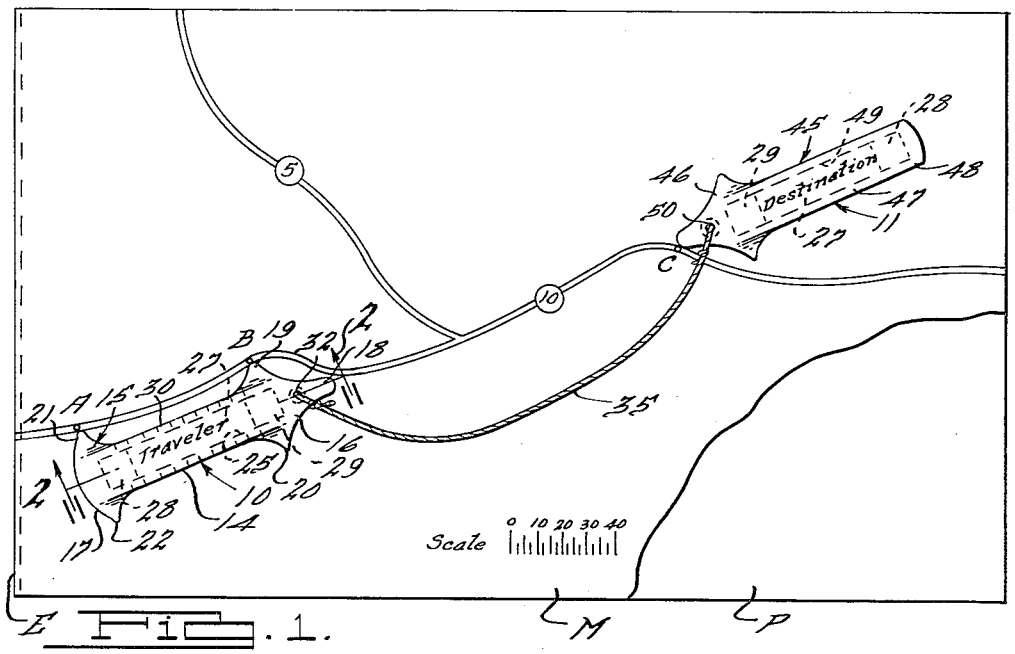
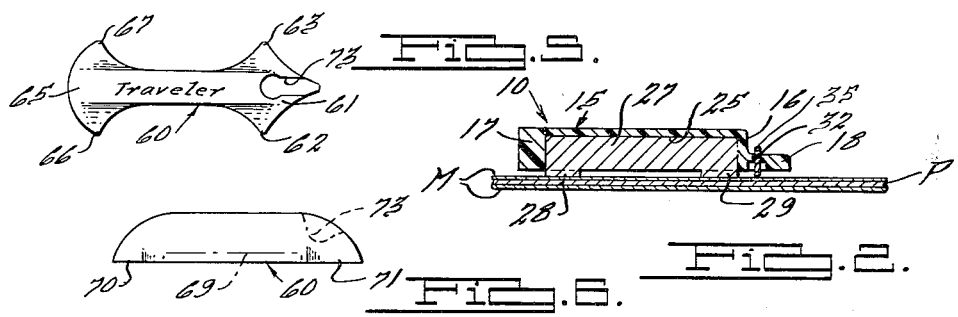
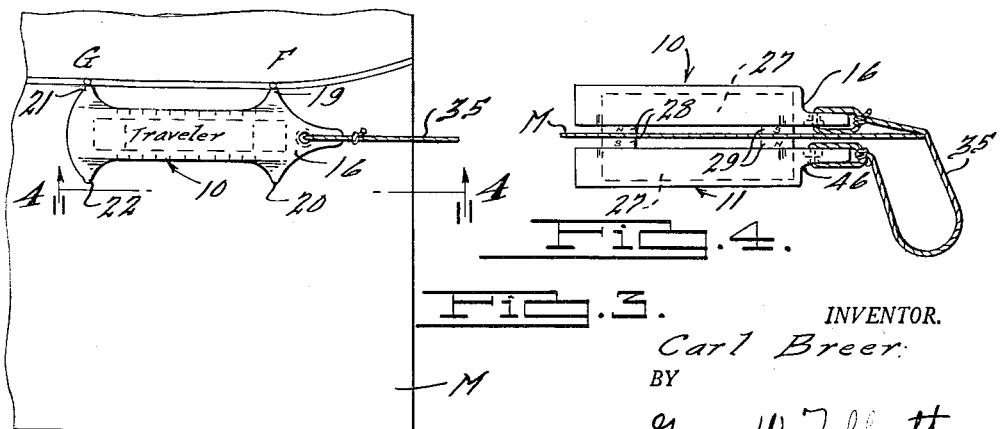
INVENTOR.
Carl Breer
BY
George W. Talbott
ATTORNEY.

United States Patent Office 2,761,413
Patented Sept. 4, 1956

2,761,413

MAGNETIC ROUTE INDICATOR

Carl Breer, Grosse Pointe, Mich.

Application April 9, 1952, Serial No. 281,365

5 Claims. (Cl. 116—114)

This invention relates to a magnetic device for use as a route indicator on maps or the like. In particular this invention comprises a pair of magnet units joined together by a flexible connector with each of the magnet units being formed so as to specifically designate the point or points between which travel is to proceed.

It is a primary object of this invention to provide an inexpensive, simplified form of route indicating device composed of an interconnected pair of magnet units that are adapted to be mounted in position on a map or the like so as to not only hold the map in an observable position but to also point out selected portions and/or points on the map.

It is another object of this invention to provide a route indicating device composed of a pair of interconnected magnets adapted to be either supported upon a magnetizable plate or superimposed on one another with the map unit arranged therebetween.

It is still another object of this invention to provide a novel form of magnetic indicating unit having spaced apart outwardly projecting indicator pointers along its periphery.

It is a further object of this invention to provide a composite magnetic indicator unit comprising a plastic outer casing having a recess that matingly receives a bar type magnet and outwardly projecting pointer elements spaced along the case periphery.

Other objects and advantages of this invention will become readily apparent from a reading of the subsequent description and a consideration of the related drawings wherein:

Fig. 1 is a plan view of a map having the magnetic device embodying this invention mounted thereon, portions of the map being broken away;

Fig. 2 is an enlarged, fragmentary sectional elevational view of a portion of Fig. 1, the view being taken along reference line 2—2 of Fig. 1;

Fig. 3 is a plan view of a map with a pair of magnet units attached to opposite sides thereof in superimposed relationship.

Fig. 4 is an enlarged, fragmentary sectional elevational view of a portion of Fig. 3, the view being taken along reference line 4—4 of Fig. 3;

Fig. 5 is a plan elevation of a modified form of integrally formed magnet unit; and Fig. 6 is a side elevational view of the integrally cast magnet unit shown in Fig. 5.

In driving motor vehicles or the like it is frequently desirable to consult a map or chart in order to ascertain one's route of travel as well as one's exact location along the selected travel route. This invention relates to a device whereby a map or chart may be held in a properly displayed position and the desired route of travel clearly pointed out so that the vehicle driver may quickly and conveniently ascertain his position and his prospective route without materially diverting his attention from his driving duties. This invention is an improvement on the device shown in my co-pending application Serial No. 109,584, filed August 10, 1949, now U. S. Patent No. 2,618,088.

Figs. 1 and 2 of the drawings show one form of the invention wherein a map M is mounted on a rigid plate P the plate P being formed from some magnetizable material such as iron or steel or alloys thereof. Preferably the map M is folded so as to form a pocket or an envelope with an opening along at least one edge, such as the edge E, into which the plate P may be slidably inserted. When the plate P is mounted between the folds of the map M in the manner shown in Figs. 1 and 2, the map M will be stretched out flat in a properly displayed position. Furthermore, the rigid plate P provides a support means for the map M that makes the map easy to handle. After mounting the map on the plate P, then the magnet units 10 and 11, which are designated "Traveler" and "Destination" respectively, are placed upon the map M so as to anchor the map M to the plate P through magnet attraction. It is thought to be obvious that the elongated bar-like, magnet units 10 and 11 span considerable portions of the map surface and that the map M will be securely held against the upper surface of the plate P by the spaced apart magnet units 10, 11.

Magnet unit 10, that is designated the "Traveler" unit, comprises a plastic case 15 of elongated form having a substantially triangularly shaped head end 16 and a fan-shaped tail end 17 when viewed in plan elevation. The head end 16 of the case 15 includes the forwardly projecting, pointed nose portion 18 and the two oppositely disposed, outwardly projecting pointer-like, side ears 19 and 20 respectively. The tail end 17 of the case 15 is also formed to provide a pair of oppositely disposed, outwardly projecting pointer-like ears 21 and 22 respectively. The elongated body portion 14 of the case 15, that extends between the head end portion 16 and the tail end portion 17, is substantially of channel-shaped formation and includes a recess 25 that is adapted to receive a rectangularly shaped bar magnet 27. The magnet 27, which may be "Alnico" III or V or similar material, is adapted to be either pressed or cemented into the case recess 25 although other means may be used to fasten the magnet 27 in the case 15. The lower side of the magnet 27 is preferably formed with downwardly projecting pad or feet portions 28, 29 at its opposite ends. The side edges of the feet 28, 29 are preferably beveled or rounded to facilitate sliding movement of the magnet unit 10 across the map M or whatever surface the magnet unit may be mounted on. The feet 28, 29 not only concentrate the magnetic flux to improve the holding power of the magnet, but in addition the body portion 14 of the magnet unit 10 is elevated slightly above the map surface so as to bridge any slight elevations or obstructions such as fold creases or the like that might interfere with the securing of the magnet unit 10 to the map M and plate P. The body portion of the case 15 between ends 16, 17 may have a scale 30 printed or impressed thereon which scale is useful in accurately estimating the distance between different points along the travel route. The nose portion 18 at the head end of the case 15 is pierced by an aperture 32 that is adapted to receive an end portion of a flexible connector 35. The flexible connector 35 may be common cord or twine and the end thereof that is threaded through the nose aperture 32 is secured to the case 15 by a knot or the like.

The magnet unit 11, that is designated the "Destination" unit, may be identical in construction to the "Traveler" unit 10 or it may be slightly different as shown in Fig. 1. The case 45 of the unit 11 is of plastic and has a head end 46 identical to the head end 16 of unit 10. The body portion 47 of the case 45 has a recess 49 to receive a rectangularly shaped bar magnet 27 that is identical to that used in the "Traveler" unit 10. The tail end 48 of the "Destination" unit 11 differs from the tail end 17 of the "Traveler" unit 10 in that the tail end 48 of the "Destination" unit omits any outwardly projecting pointer-like ears such as the ears 21, 22 of the "Traveler" unit 10. The tail end 48 of the "Destination" unit 11 may be of the smooth square form disclosed, or it may be slightly rounded to omit any sharp edges. The nose portion 46 of the "Destination" unit 11 is pierced by an aperture 50 that is adapted to receive an end of the flexible connector 35. Connector 35 may have its end anchored to the nose end 46 of the "Destination" unit by a knot or the like.

The "Traveler" unit case 15 may be of a green plastic material and the wording "Traveler" can be molded therein or impressed thereon or a different color paint or the like could be used to label the unit 10 as "Traveler." In contrast the "Destination" unit case 45 may be of a red plastic material and the wording "Destination" can be applied to the case in a contrasting paint or in any other conventional form as by molding, impressing or the like.

In using the units 10, 11 as shown in Figs. 1 and 2, the "Traveler" unit 10 may be placed along the selected travel route so that its ear pointer 21 is located at the starting point A of travel and the ear pointer 19 placed at another point B farther along the travel route. The nose portion 46 of the "Destination" unit may be placed at the final destination point C on the travel route. As travel progresses the "Traveler" unit can be moved along the travel route until the "Traveler" unit approaches the "Destination" unit at the end of the travel route. Due to the arrangement of the pointers 19, 20, 21, 22 along opposite sides of the "Traveler" unit 10, the unit 10 can be placed on either side of the travel route. This is of importance when the travel route is along the edge of the map.

Figs. 3 and 4 show the use of the interconnected magnet units 10, 11 in a second manner. In Figs. 3 and 4 the "Traveler" unit 10 is placed on the top surface of the map M and the "Destination" unit 11 is placed directly beneath the unit 10 against the under surface of the map M. The units 10 and 11 magnetically attract each other and the map M is clampingly engaged therebetween. It should be noted that the magnet units 27 of the two units 10, 11 are arranged such that the magnet feet 28, 29 at the ends thereof are oppositely polarized. That is (see Fig. 4) unit 10 has a north pole N at its head end and a south pole S at its tail end. Accordingly, when the magnet units 10, 11 are superimposed as shown in Fig. 4 the two nose portions 16, 46 may be arranged over one another and maintained in such a position by magnetic attraction. As travel progresses along the travel route from point G to point F (see Fig. 3) the connector 35 may be grasped and pulled to simultaneously move both magnet units 10, 11 to new locations along the travel route. It is also possible to move both of the magnet units 10, 11 from one position to another by merely grasping either one of the units 10 or 11 and moving it to a new position. The other magnet unit will be automatically moved along to the new location due to the magnetic forces linking the two units 10, 11 together.

Figs. 5 and 6 show a modified form of magnet unit 60 that is formed as an integral casting of suitable magnetic material rather than as a composite unit built up from a bar magnet and an enclosing plastic case. The unit 60 is shaped similar to the magnet unit 10 in that it includes a triangularly shaped nose portion 61 with outwardly extending, oppositely disposed, pointer-like ears 62 and 63. The tail end 65 of the magnet unit 60 is formed with a fan-shape, as seen in plan elevation, and here again a pair of oppositely disposed, outwardly projecting, pointer-like ears 66 and 67 are provided. The body portion 68 of the magnet is solid and its underside may be recessed as indicated in broken lines 69 (see Fig. 6) to provide pads or feet 70 and 71 at opposite ends of the magnet unit. The nose portion 61 of the magnet unit 60 may be pierced by an aperture that is adapted to receive a flexible connector or it may be formed with a recess 73 into which a cord end may be anchored by cement or the like. The use of the magnet unit is identical to that described with relation to units 10 and 11.

I claim:

1. A route indicating element comprising an elongated, bar-like, arrow-shaped, magnet unit having a plurality of outwardly projecting, longitudinally spaced pointer elements extending from opposed sides of the periphery thereof and an elongated pointed nose portion extending from the forward end thereof, said magnet unit having a pair of the said spaced outwardly projecting pointer elements positioned along each of two opposed sides thereof.

2. A route indicating element comprising an elongated, arrow like, magnet unit having a plurality of outwardly projecting, longitudinally spaced pointer elements extending from opposed sides of the periphery thereof and an elongated pointed nose portion extending from the forward end thereof, said magnet unit having a pair of the said spaced outwardly projecting pointer elements positioned along each of two opposed sides thereof with scale means mounted between each pair of said spaced pointers, the pointer elements on the opposed sides of said magnet being arranged in transversely aligned pairs.

3. A route indicating element comprising an elongated, bar-like, arrow-shaped, magnet unit having a plurality of outwardly projecting, longitudinally spaced pointer elements extending from opposed sides of the periphery thereof and an elongated pointed nose portion extending from the forward end thereof, said magnet unit having a pair of the said spaced outwardly projecting pointer elements positioned along each of two opposed sides thereof with scale means mounted between each pair of said spaced pointers, and said magnet device having offset magnetized feet at the opposite ends thereof.

4. A route indicating element comprising an elongated, arrow-shaped, magnet unit having a plurality of outwardly projecting, longitudinally spaced pointer elements extending from each of the opposite sides of the periphery thereof and an elongated pointed nose portion extending from the forward end thereof, said magnet unit comprising an elongated bar magnet and a casing therefor, said casing having a recess therein to receive the bar magnet and mounting the outwardly extending, spaced pointer elements.

5. A route indicating element comprising a pair of elongated, arrow-shaped, magnet units interconnected by flexible means, each magnet unit having a plurality of outwardly projecting, longitudinally spaced pointer elements extending from opposite sides of the periphery thereof and an elongated pointed nose portion extending from the forward end thereof, said magnet units each comprising an elongated bar magnet and a casing therefor, said bar magnet unit having offset magnetized feet at each end thereof and said casing having a recess therein to receive the bar magnet and mounting the outwardly extending, spaced pointer elements.

References Cited in the file of this patent

UNITED STATES PATENTS

| | | |
|---|---|---|
| 1,484,064 | Erikson | Feb. 19, 1924 |
| 2,177,905 | McKeehan | Oct. 31, 1939 |
| 2,330,951 | Burmester | Oct. 5, 1943 |
| 2,431,827 | Rado | Dec. 2, 1947 |
| 2,448,611 | Martin | Sept. 7, 1948 |
| 2,567,189 | Davis | Sept. 11, 1951 |

FOREIGN PATENTS

| | | |
|---|---|---|
| 19,908 | Great Britain | July 20, 1905 |